(12) United States Patent
Schambre et al.

(10) Patent No.: US 6,464,279 B1
(45) Date of Patent: Oct. 15, 2002

(54) SELF STOWING SEAT

(75) Inventors: John E Schambre, Canton, MI (US); Raymond C Deyonker, Wixom, MI (US); Marcus G Washington, Detroit, MI (US); Michael O Forker, Novi, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/879,234

(22) Filed: Jun. 11, 2001

(51) Int. Cl.[7] .................................................. B60N 2/06
(52) U.S. Cl. ..................................................... 296/65.13
(58) Field of Search .............................. 296/63, 55.03, 296/69, 65.01, 66, 65.13; 297/16.1, 61, 129, 118, 218.1, 283.1, 283.2, 284.3

(56) References Cited

U.S. PATENT DOCUMENTS

| | | | |
|---|---|---|---|
| 5,806,910 A | * | 9/1998 | DeRees .................... 296/63 X |
| 5,941,602 A | | 8/1999 | Sturt et al. ................... 297/340 |
| 6,012,755 A | | 1/2000 | Hecht et al. .............. 296/65.03 |
| 6,036,252 A | | 3/2000 | Hecksel et al. .......... 296/65.03 |
| 6,053,555 A | | 4/2000 | Neale ....................... 296/65.03 |
| 6,088,116 A | | 7/2000 | Pfanstiehl .................... 356/445 |
| 6,123,380 A | | 9/2000 | Sturt et al. ................ 296/65.09 |
| 6,129,404 A | | 10/2000 | Mattarella et al. ........ 296/65.09 |
| 6,131,999 A | | 10/2000 | Piekny et al. ................ 297/378 |
| 6,142,552 A | | 11/2000 | Husted et al. ............ 296/65.09 |
| 6,231,101 B1 | * | 5/2001 | Kamida et al. ................ 296/63 |

* cited by examiner

*Primary Examiner*—D. Glenn Dayoan
*Assistant Examiner*—Jason Morrow
(74) *Attorney, Agent, or Firm*—Ralph E. Smith

(57) ABSTRACT

The present invention provides a roll top seat assembly structure that is slidable between an active position and an inactive position. In the active position, the seat assembly is slid along opposing tracks located on either side of a vehicle's interior sides to form a fully functioning rear seat equipped with head rests and seat belts. In the inactive position, the roll top seat assembly is slid along the opposing tracks to stow flat along the cargo floor of the vehicle's interior, thereby providing the entire area with cargo room.

12 Claims, 5 Drawing Sheets

SELF STOWING SEAT

FIELD OF THE INVENTION

The present invention relates to passenger vehicles and seating systems. More particularly, the present invention relates to a vehicle seat adapted for use in connection with enhanced capacity vehicles such as station wagons, sport utility vehicles and vans that have an enlarged cabin area for carrying either more cargo, more passengers or both than a conventional sedan.

BACKGROUND OF THE INVENTION

It is known in the art of automotive vehicle body design to provide enhanced capacity vehicles with forward seat assemblies for a driver and a front passenger, a rear seat assembly, and an intermediate seat assembly located at a mid-vehicle position. As both cargo and passenger carrying capacity are valued, it is desirable to design the intermediate and rear seat assemblies to carry additional passengers and additional cargo, and to be convertible easily between an enhanced passenger carrying configuration and an enhanced cargo carrying configuration.

Many of the rear seat assemblies are designed to be removable, foldable or collapsible to improve cargo capacity. However, such assemblies are typically bulky and cumbersome for the user to operate. The seat assembly may be heavy and require awkward actuation of release levers, causing difficulty in collapsing the seat assembly within the confined space of a vehicle interior. Further, the folded seats take up space and impinge on the desired cargo carrying capacity. Other seat arrangements provide for a rear seat assembly that is completely removable from the vehicle. A disadvantage of this design is that the seat must be stored in an independent storage area. Further, if the seat is needed or preferred, the stored seat may not be immediately available to the user, forcing an undesirable situation of having the occupants sit unrestrained in the cargo area, if necessary.

Examples of patents showing various seating and cargo configurations for enhanced capacity vehicles are U.S. Pat. No. 5,941,602 issued Aug. 24, 1999 to Sturt et al. and entitled "Folding Seat Assembly"; U.S. Pat. No. 6,012,755 issued Jan. 11, 2000 to Hecht et al. and entitled "Foldable Automotive Seat"; U.S. Pat. No. 6,036,252 issued Mar. 14, 2000 to Hecksel et al. and entitled "Automotive Bench Seat with Fixed Rollers and Linear Floor Latch"; U.S. Pat. No. 6,053,555 issued Apr. 25, 2000 to Neale and entitled "Removable Seat Assembly"; U.S. Pat. No. 6,123,380 issued Sep. 26, 2000 to Sturt et al. and entitled "Automotive Seat Assembly with Folding Structural Supports for Storage in a Foot Well for an Automotive Vehicle Body"; U.S. Pat. No. 6,131,999 issued Oct. 17, 2000 to Piekny et al. and entitled "Folding Vehicle Seat Assembly"; and U.S. Pat. No. 6,142,552 issued Nov. 7, 2000 to Husted et al. and entitled "Third Automotive Seat Assembly for an Automotive Vehicle".

None of the above-described patents disclose a self-stowing rear seat assembly capable of being stowed away into the floor of the vehicle thereby providing full cargo space usage. Further, none of these patented seat assemblies provide a roll-up seat assembly having fully functioning head rests and occupant restraints while eliminating the need for large floor pan depressions or complete removal of the rear seat assembly from the vehicle.

SUMMARY OF THE INVENTION

It is therefor an object of the present invention to provide a self-stowing rear seat assembly in a vehicle seating system.

It is further an object of the present invention to provide a rear seat assembly that stows away into the floor of the vehicle thereby providing full cargo space usage.

It is still further an object of the present invention to provide a rear seat assembly having a roll-top configuration that rolls upward from a stored position into a fully functioning seat assembly equipped with head rests and occupant restraints.

It is another object of the invention to provide additional passenger and cargo space without requiring removal of the rear seat assembly from the vehicle.

Finally, it is an object of the invention to provide additional passenger and cargo space without necessitating a large floor pan depression in the floor of the vehicle to support the stored rear seat assembly.

The present invention overcomes the above referenced shortcomings of the prior art vehicle seat assemblies by providing a roll top seat assembly structure that is slidable between an active position and an inactive position. In the active position, the seat assembly is slid along opposing tracks located on either side of a vehicle's interior sides to form a fully functioning rear seat equipped with head rests and seat belts. In the inactive position, the roll top seat assembly is slid along the opposing tracks to stow flat along the cargo floor of the vehicle's interior, thereby providing the entire area with cargo room.

DETAILED DESCRIPTION OF THE PREFERRED EMBODIMENT

Figure 1:
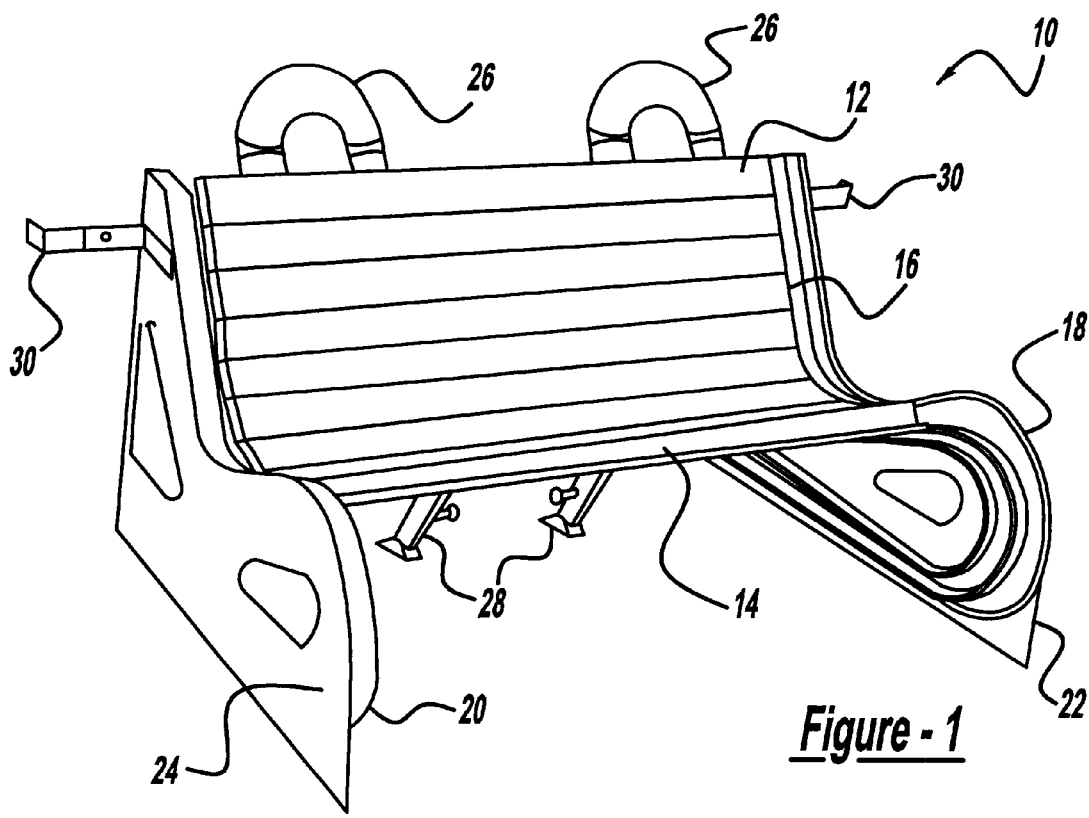
FIG. 1 is a perspective view of a preferred embodiment of the present invention in its active position.
Figure 2:
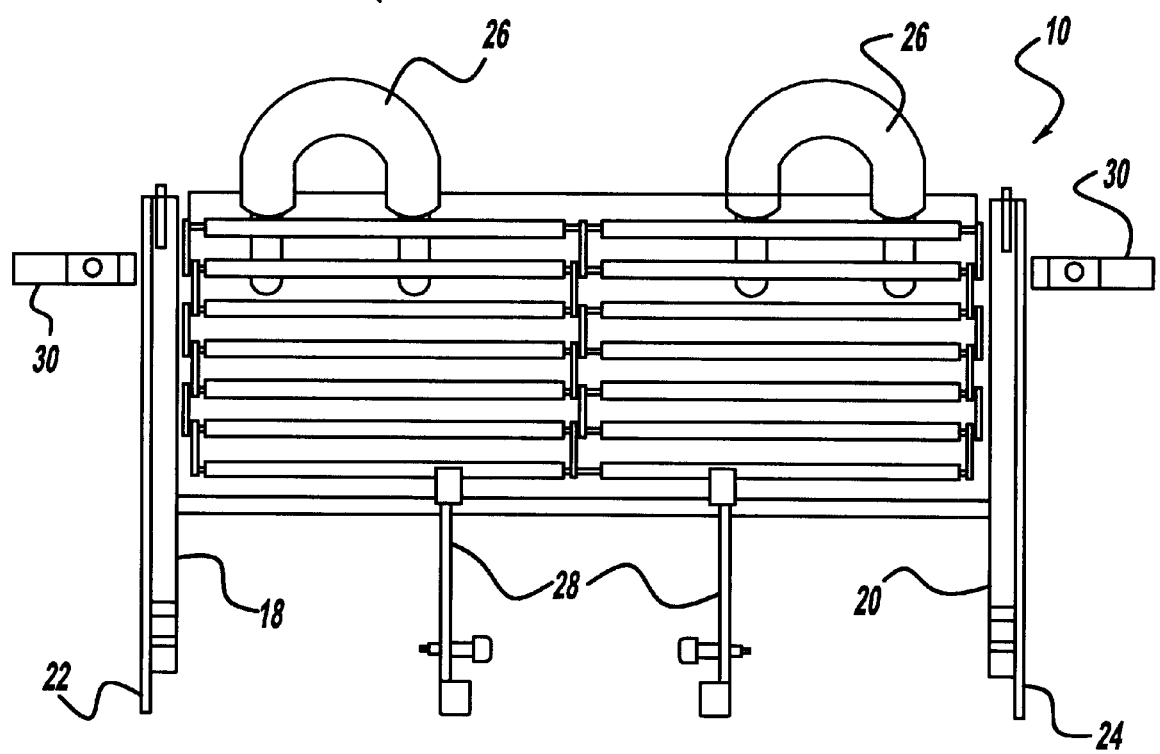
FIG. 2 is a rear view of a preferred embodiment of the present invention in its active position.

With reference to FIGS. 1 and 2, a roll top seat assembly 10 of the present invention is there shown in an active position and is preferably located within the rear section of a passenger vehicle (not shown.) The seat assembly 10 includes a continuous seat 12 forming both the lower seat portion 14 and the seat back support 16. The roll top seat assembly 10 is slidable along opposing tracks 18,20 supported within a vehicle's sides by brackets 22,24. Head rests 26 are also provided and extend from the seat back support 16 of the roll top seat assembly 10. Anchors 28 are also provided and serve the dual purpose of supporting the lower seat portion 14 in an active position and anchoring seat belt assemblies (not shown) for use in the active position. Opposing side brackets 30 also support the roll top seat assembly 10 to the body of the passenger vehicle.

Figure 3:
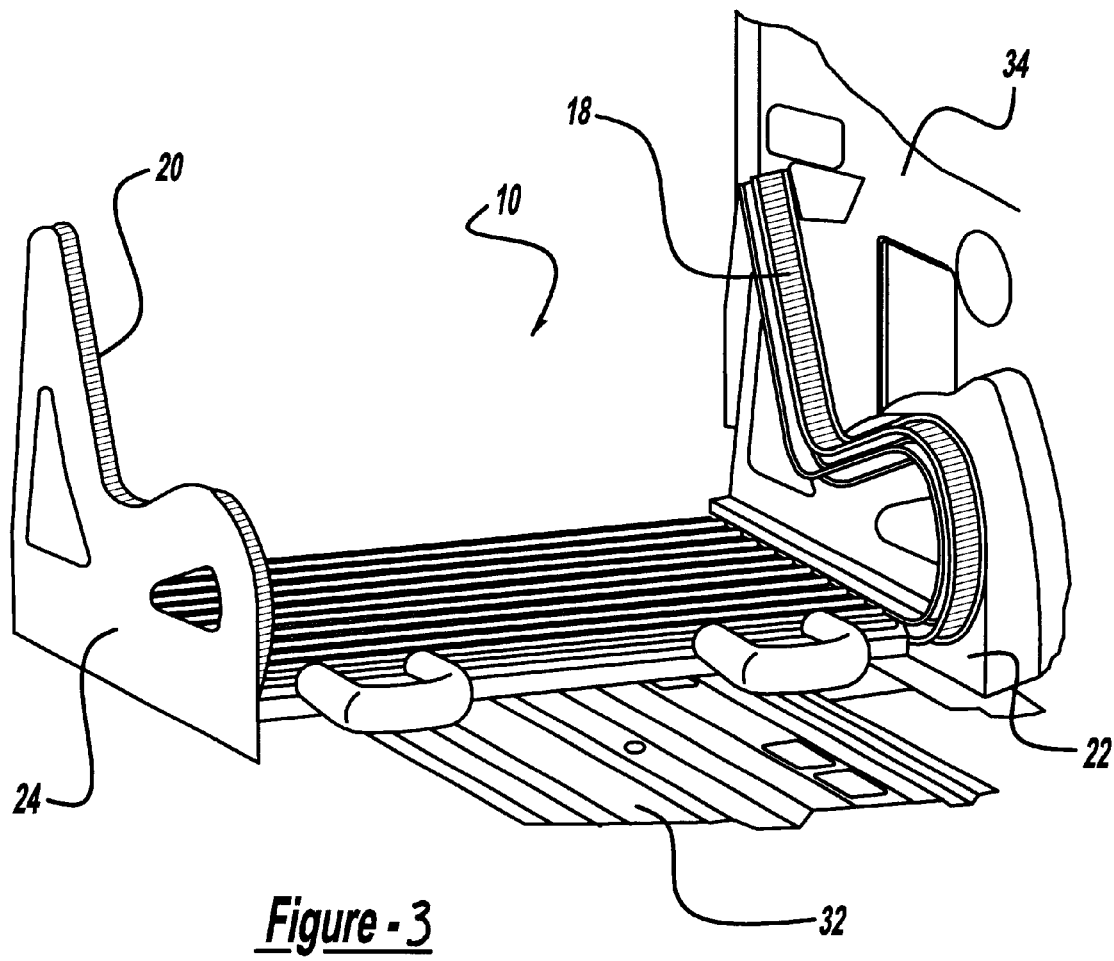
FIG. 3 is a perspective view of a preferred embodiment of the present invention in its inactive position.

FIG. 3 shows the preferred embodiment of the roll top seat assembly 10 in an inactive or stowed position within the passenger vehicle area. In this position, the roll top seat assembly is slid downwardly along opposing tracks 18, 20 toward the floor area 32 of the passenger vehicle area. The body 34 of the passenger vehicle is partially shown to better reveal the preferred placement of the tracks 18,20 and brackets 22,24 along the interior of the body 34. In the preferred embodiment, the tracks 18,20 and brackets 22,24 are covered with interior panels and may be provided with a brushed opening or rubber boot extending from the interior panel trim to allow the roll top seat assembly 10 to slide along the tracks 18,20 while protecting passengers from the movable parts of the tracks 18,20. When the roll top seat assembly 10 of the present invention is in its inactive position, additional cargo space is provided within the passenger vehicle area. The roll top seat assembly 10 readily rolls down into its inactive position within 3–4 inches of the floor 32 of the vehicle. Thus, no modifications or large pan depressions within the floor 32 are needed to support the seat assembly 10 in its stowed position. Further, the ability to stow the seat assembly 10 within the vehicle provides a means for maintaining access to the seat assembly 10 rather than having to remove the assembly from the vehicle as is known in the prior art.

Figure 4:
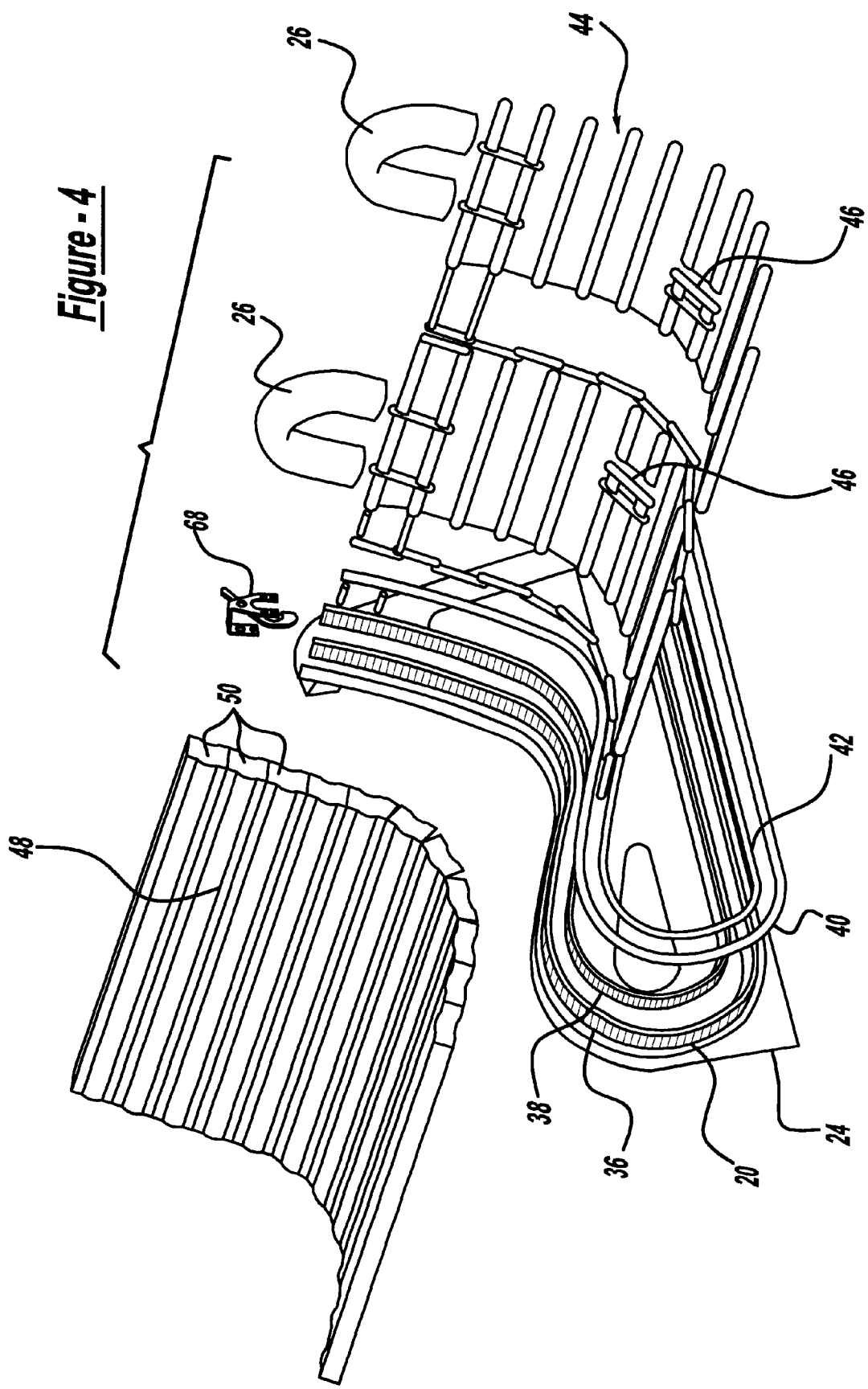
FIG. 4 is an exploded perspective view of a preferred embodiment of the present invention in its active position.
Figure 5:
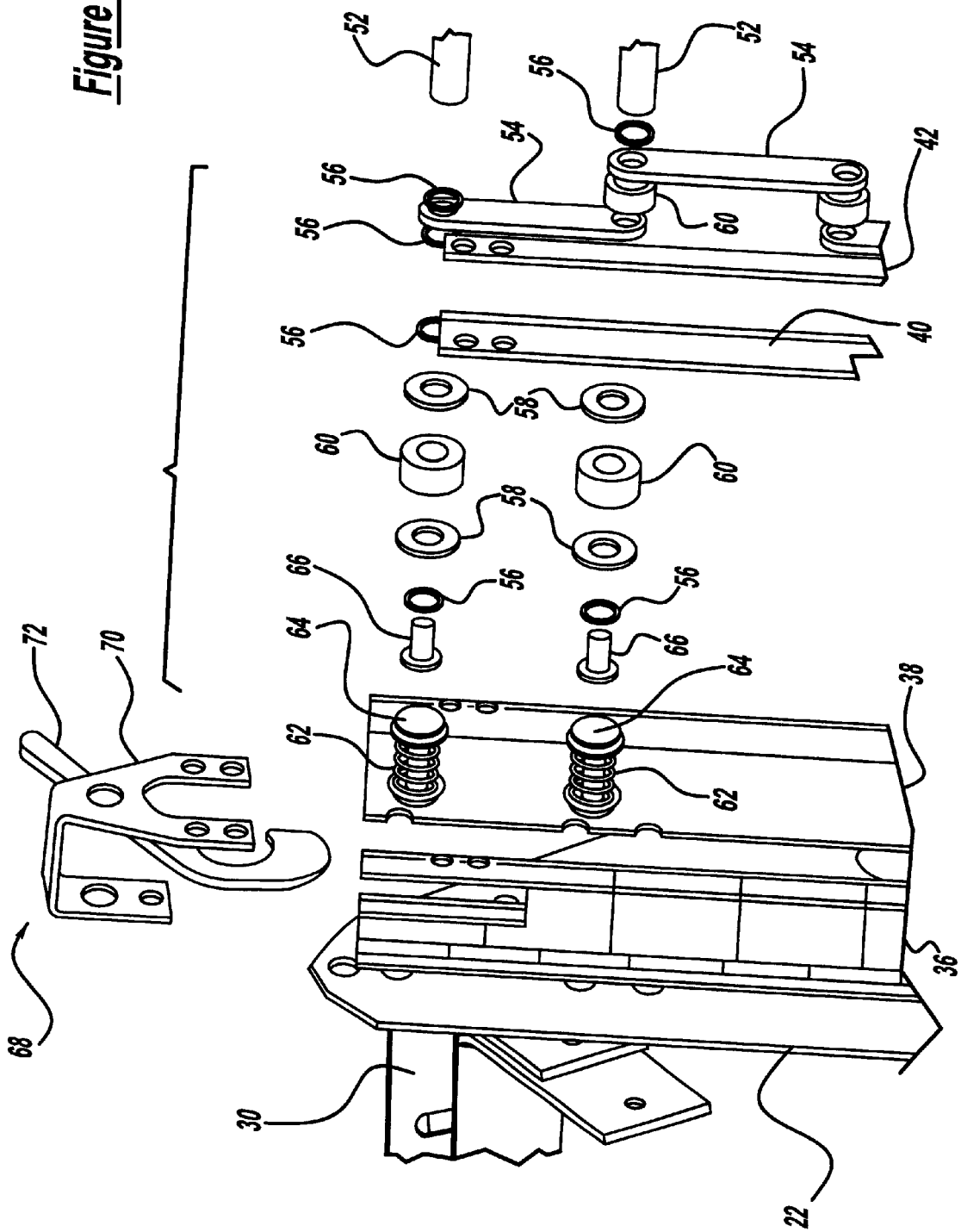
FIG. 5 is an exploded view of the track and latching mechanism of the preferred embodiment of the present invention.

With reference now to FIGS. 2, 4 and 5, the inner structure of the roll top seat assembly 10 of the present invention is there shown. Bracket 24 is shown supporting track 20. Track 20 is preferably formed of an upper track 36 and a lower track 38 for guiding the seat 12 between its active and inactive position. Only ½ of the track assembly is shown but it is to be presumed that track 18 with bracket 22 is a mirror image of what is described. Upper track reinforcement guide 40 and lower track reinforcement guide 42 are provided to support seat 12 between positions. Seat backing 44 is generally shown in FIG. 4 along with a portion of anchoring assembly 46. A locking mechanism 68 is also shown in FIG. 4 and secures the seat assembly 10 in its active position. Cover seat 48 with foam padding cushion 50 is attached to the seat backing 44 by sewing, gluing or any other feasible means to ensure fixed attachment yet flexibility of the cover seat 48 during travel between the active and inactive positions.

FIG. 5 details the preferred tracking mechanism of the present invention within the upper and lower tracks 36, 38. Rod supports 52, preferably ½ inch in diameter, extend horizontally to form the skeleton of the seat backing 44 (FIG. 4). These rods 52 extend perpendicular to links 54 and are maintained in place to the upper and lower track reinforcement guides 40,42 by retaining clips 56. Spacers 58 and rollers 60 may be interspersed along the rod linkage as needed to allow the seat assembly 10 to roll as desired within the tracks 18,20. An end plug 64 centers the assembly via end plug spring 62 and end plug tube 66. Bracket 30 secures bracket 22 to the body of the vehicle 34 (FIG. 3.) A locking mechanism 68 formed of a latch bracket 70 supporting a latch 72 is provided to secure the seat assembly 10 in its active position. The locking mechanism 68 is preferably secured to the upper end of bracket 22.

Figure 6:
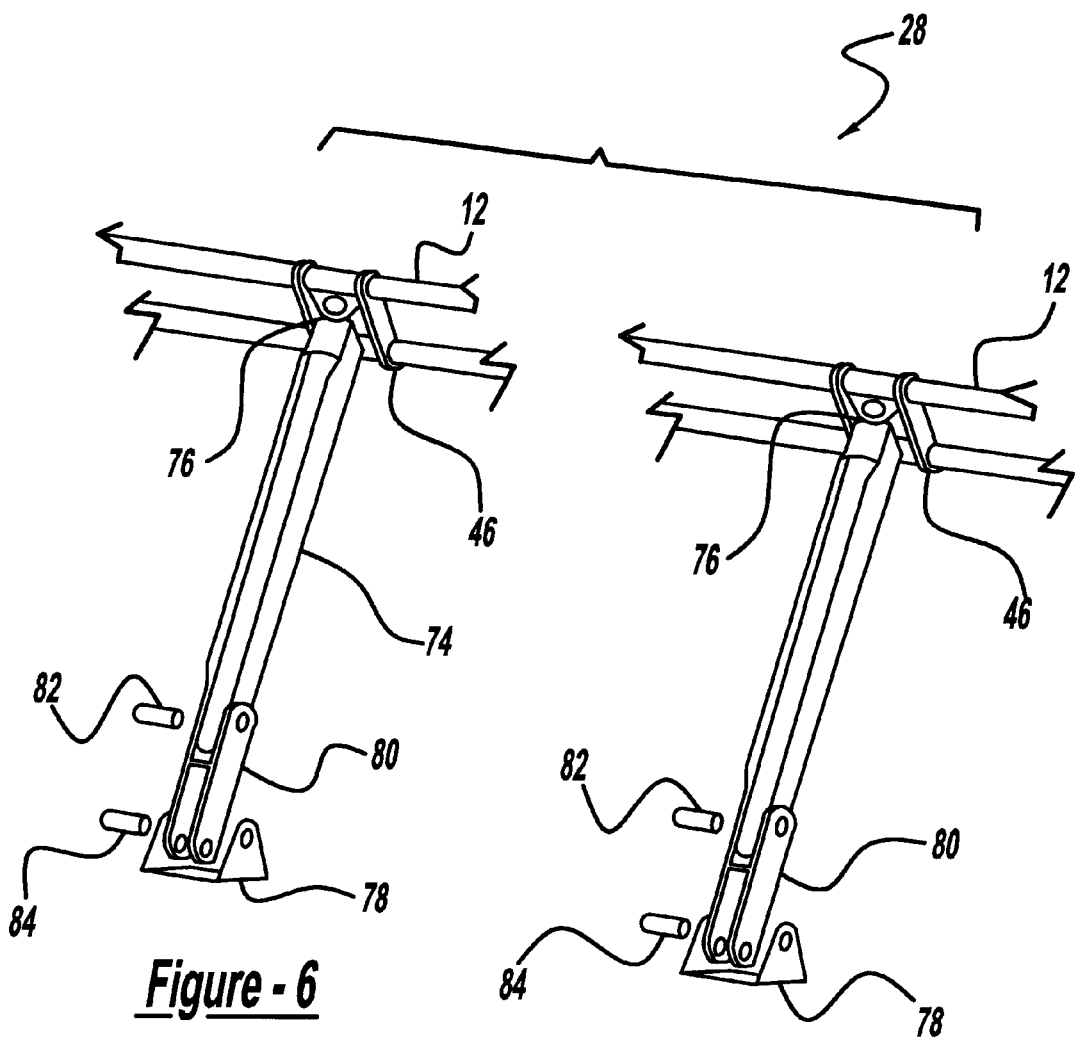
FIG. 6 is an exploded view of the anchoring mechanism of the preferred embodiment of the present invention.

With reference now to FIGS. 2 and 6, anchors 28 are shown for supporting the seat assembly 10 in the active position. These anchors also provide support for seat belt assemblies. Anchors 28 are pivotally attached to seat 12 by anchoring assemblies 46 formed of a bracket-like fixture. An arm 74 extends downwardly from pivot 76. A bracket 78 is secured to the floor 32 of the vehicle. A link 80 is provided to secure arm 74 to bracket 78 via pins 82, 84.

When the seat assembly 10 is in the inactive position, pins 84 have been removed, releasing the arms 74 from the brackets 78. Arms 74 are pivoted upwardly toward the seat back support 16 and the roll top seat assembly is pulled downward toward the floor 32 of the vehicle. In this inactive position, the arms 74 lay flat against the seat assembly 10. When the seat assembly is in the active position, the seat 12 is rolled upwardly on tracks 18,20 and secured in place by anchors 28. More specifically, arms 74 are pivoted downwardly toward floor 34 and locked into brackets 78 by pins 84.

Other forms of guiding and locking the roll top seat assembly are envisioned. For instance, a sliding track may be used in place of a rolling conveyor type system described above. Anchoring assemblies may pivot upwardly from the floor for attachment to the seat and may be provided with other structural arrangements that fulfill safety requirements for seat belt assemblies. It is further envisioned that the seat assembly may be slid between an active and an inactive position either manually or by propulsion, electrical or otherwise.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A roll top seat assembly for a vehicle comprising:

a seating portion for supporting a passenger thereon;

a pair of side brackets connected to the vehicle and arranged to support therebetween the seating portion in an active position elevated relative to the vehicle floor, wherein each side bracket includes a track, and the seating portion is slidable along said track between the active and an inactive position.

2. The roll top seat assembly of claim 1, wherein the seating portion includes a continuous seat and seat back portion, both the seat and seat back portions being arranged to slide along the track between the active and inactive position.

3. The roll top seat assembly of claim 1, wherein sliding the seating portion into said inactive position moves an outer passenger contact surface of the seating portion downward opposing tie floor of the vehicle in a stowed configuration within said vehicle passenger compartment.

4. The roll top seat assembly defined in claim 1 and further comprising means for locking said seat assembly in said active position.

5. The roll top seat assembly defined in claim 1 and further comprising means for stowing said seat assembly in said inactive position.

6. The roll top seat assembly of claim 1 and further comprising an anchor within said vehicle and pivotable between an open and a closed position for supporting said seat assembly in said active position when in said open position.

7. The roll top seat assembly of claim 6, wherein said anchor further comprises support for a seat belt.

8. The roll top seat assembly of claim 1, and further comprising a head rest extending from said seat assembly when the seating portion is in said active position.

9. A seat assembly for a passenger vehicle compartment comprising:
- a roll top structure forming a lower seat portion and a seat back support, wherein said lower seat portion and said seat back support are formed from a continuous seat cover; and
- a track extending on either side of said roll top structure for sliding said seat assembly between an active position and an inactive position, wherein said active position provides additional passenger seating within said passenger vehicle and wherein said inactive position provides additional cargo space within said passenger vehicle.

10. The seat assembly of claim 9, wherein said seat assembly is provided with a head rest fixedly attached to said seat back support and is fully functioning when said seat assembly is in said active position.

11. The seat assembly of claim 9, wherein said seat assembly is provided with a seat belt anchored to said lower seat portion and is fully functioning when said seat assembly is in said active position.

12. The seat assembly of claim 9, wherein said passenger vehicle compartment cargo space is not compromised when said seat assembly is in said inactive position.

* * * * *